（12） United States Patent
Peters et al.

(10) Patent No.: US 6,868,381 B1
(45) Date of Patent: Mar. 15, 2005

(54) METHOD AND APPARATUS PROVIDING HYPOTHESIS DRIVEN SPEECH MODELLING FOR USE IN SPEECH RECOGNITION

(75) Inventors: Stephen Douglas Peters, Pt Claire (CA); Daniel Boies, Candiae (CA); Benoit Dumoulin, Montreal (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/468,138

(22) Filed: Dec. 21, 1999

(51) Int. Cl.[7] .......................... G10L 15/00; G10L 15/08; G10L 15/06
(52) U.S. Cl. ...................... 704/249; 704/231; 704/236; 704/244
(58) Field of Search ............................... 704/260, 256, 704/255, 254, 250, 244, 243, 239, 238, 232, 231, 222

(56) References Cited

U.S. PATENT DOCUMENTS

| 5,170,432 | A | * | 12/1992 | Hackbarth et al. | ........... | 704/254 |
| 6,151,575 | A | * | 11/2000 | Newman et al. | ............ | 704/260 |
| 6,263,309 | B1 | * | 7/2001 | Nguyen et al. | ............. | 704/239 |
| 6,327,565 | B1 | * | 12/2001 | Kuhn et al. | .................. | 704/255 |
| 6,343,267 | B1 | * | 1/2002 | Kuhn et al. | .................. | 704/222 |

OTHER PUBLICATIONS

Huo et al., "Robust Speech Recognition Based on Off–line Elicitation of Multiple Priors and On–line Adaptive Fusion," Proceedings of ICSLP 2000 vol. IV, pp. 480–483.*

Westwood "Speaker Adaptation Using Eigenvoices," MPil in Computer Speech and Language Processing, Department of Engineering, Cambridge University, Aug. 31, 1999.*

Kuhn R. et al. (1998) "Eigenvoices for speaker adaptation", Proc. IC–SLP '98, vol. 5, Sydney, pp. 1771–1774.

* cited by examiner

Primary Examiner—Vijay Chawan
Assistant Examiner—V Paul Harper

(57) ABSTRACT

A speech recognition system having an input for receiving an input signal indicative of a spoken utterance that is indicative of at least one speech element. The system further includes a first processing unit operative for processing the input signal to derive from a speech recognition dictionary a speech model associated to a given speech element that constitutes a potential match to the at least one speech element. The system further comprised a second processing unit for generating a modified version of the speech model on the basis of the input signal. The system further provides a third processing unit for processing the input signal on the basis of the modified version of the speech model to generate a recognition result indicative of whether the modified version of the at least one speech model constitutes a match to the input signal. The second processing unit allows the speech model to be modified on the basis of the recognition attempt thereby allowing speech recognition to be effected on the basis of the modified speech model. This permits adaptation of the speech models during the recognition process. The invention further provides an apparatus, method and computer readable medium for implementing the second processing unit.

17 Claims, 8 Drawing Sheets

METHOD AND APPARATUS PROVIDING HYPOTHESIS DRIVEN SPEECH MODELLING FOR USE IN SPEECH RECOGNITION

FIELD OF THE INVENTION

This invention relates to the field of speech recognition and more particularly to a method and apparatus for providing model adaptation on a basis of a spoken utterance. This invention is applicable to speech recognition systems of the types used in directory assistance systems, voice dictation systems and other voice activated services.

BACKGROUND OF THE INVENTION

In a typical speech recognition application, the user inputs into an input device such as a microphone or telephone set. If valid speech is detected, the speech recognition layer is invoked in an attempt to recognize the unknown utterance. In a commonly used approach, on a first pass search, a fast match algorithm is used to select the top N orthography groups from a speech recognition dictionary. In a second pass the individual orthographies from the selected groups are re-scored using computations on more precise speech models. The top orthography in each of the top two groups is then processed by a rejection algorithm that evaluates if they are sufficiently distinctive from one another so the top choice candidate can be considered to be a valid recognition.

Speech recognition systems can be assigned to two distinct categories, namely speaker-specific (or speaker dependent) and speaker independent. These categories differ primarily in the manner these systems are trained and used.

Training of a speech recognition system establishes a reference memory and speech models to which are assigned speech labels. For speaker-independent systems, training is performed by collecting samples from a large pool of users. For a given speech-recognition task, a speaker-specific (SS) system generally performs better than a speaker-independent (SI) system. Typically, for a speaker-independent system, a single speech model is used for all speakers while in a speaker-specific system, each user is assigned a respective speech model set. Speaker-specific systems are trained by collecting samples from the end user. For example, a voice dictation system where a user speaks and the device translates his words into text will most likely be trained by the end user (speaker-specific) since this training fashion can achieve a higher recognition performance. In the event that someone else than the original user wants to use the same device, that device can be retrained or an additional set of models can be trained and stored for the new user. When the training data for training the speaker specific systems is not readily available, speaker independent systems tend to be used as well. In addition, as the number of users becomes large, storing a separate speaker specific speech model set for each user becomes prohibitive in terms of memory requirements. Therefore, as the number of users becomes large, speech recognition systems tend to be speaker independent.

A common approach to improve the performance of speaker independent speech recognition systems is adaptation: adjusting either speech models or features in a manner appropriate to the current speaker and environment. A typical adaptation technique is model adaptation. Generally, speaker adaptation starts with speaker-in independent speech models derived from one or more speakers and then, based on a small amount of speech from a new speaker, creates new speaker-dependent models so that the recognition of the new speaker is improved. For a more detailed explanation on model adaptation, the reader is invited to consult R. Schwartz and F Kubala, *Hidden Markov Models and Speaker Adaptation*, Speech Recognition and Understanding: Recent Advances, Eds: P. Laface et R. De Mori, Springer-Verlag, 1992; L. Neumeyer, A. Sankar and V. Digalakis, *A Comparative Study of Speaker Adaptation Techniques*, Proc. Of EuroSpeech '95, pp.1127–1130, 1995; J.-L. Gauvain, G.-H. Lee, *Maximum a. Posteriori Estimation for Multivariate Gaussain Mixture Observations of Markov Chains*, IEEE. Trans. on Speech and Audio Processing, Vol 2, April 1994, pp.291–298; and C. J. Leggetter, P C. Woodland, *Maximum Likelihood Linear Regression for Speaker Adaptation of Continuous Density Hidden Markov Models*, Computer, Speech and Language, Vol.9, 1995, pp171–185. The content of these documents is hereby incorporated by reference.

A deficiency in the above-described methods is that they require a relatively large amount of data on the basis of the usual relationship between training data and parametric complexity. While humans seem to be able to adapt to a new speech environment in just a few syllables, such speech recognition system adaptation requires considerably more adaptation data which may not be available.

A common approach makes use of a single set of transformation parameters for a set of speech models. In this manner a reduced number of transformation parameters permits effective adaptation with a reduced amount of data. A deficiency in tying the transformation parameters is that any model specific transformation will not be reflected in the single set of parameters.

Another method is an adaptation method described in Kuhn R. et al. (1998), "Eigenvoices for speaker adaptation," Proc. ICSLP '98, vol. 5, Sydney, pp.1771–1774. The content of this document is hereby incorporated by reference. This adaptation method requires less adaptation data then the methods mentioned previously. A deficiency of the method presented by Kuhn R. et al. (1998) is that it provides an improved performance for speakers for whom training data is available. A deficiency of this approach is that the acoustic characteristics of specific speakers, not part of the training data, is generally not captured by this method.

Consequently, there is a need in the industry for providing a method and apparatus for providing a speech recognition system capable of adapting speech models on the basis of a minimal amount of data, preferably from the first word given by a given speaker.

SUMMARY OF THE INVENTION

In accordance with a broad aspect, the invention provides a speech recognition system comprising an input for receiving an input signal derived from a spoken utterance that is indicative of at least one speech element. The speech recognition system further comprises a first processing unit coupled to the input operative for processing the input signal to derive from a speech recognition dictionary at least one speech model associated to a given speech element that constitutes a potential match to the at least one speech element. The speech recognition system further comprises a second processing unit coupled to the first processing unit for generating a modified version of the at least one speech model on the basis of the input signal. The speech recognition system further comprises a third processing unit coupled to the second processing unit for processing the input signal on the basis of the modified version of the at least one speech model. The third processing unit is operative to generate a recognition result indicative of whether the modified version of the at least one speech model constitutes a match to the input signal. The speech recognition system further provides an output for releasing a signal indicative of the recognition result.

Advantageously, by allowing the at least one speech model to be modified on the basis of the recognition attempt and then effecting speech recognition on the basis of the modified at least one speech model, adaptation of the speech modes is effected during the recognition process.

In a specific example of implementation, the first processing unit implements a first-pass recognition process making use of low-complexity low-definition models to derive the speech model that constitutes a match to the input signal. The second processing unit implements an apparatus for generating a hybrid speech model by processing the speech model that constitutes a potential match to the input signal to generate a modified version of the speech model. As a variant the second processing unit implements an apparatus for generating a complex speech model by processing the speech model that constitutes a potential match to the input signal to generate a modified version of the speech model. The third processing unit comprises a re-scoring unit operative to process the modified version of the speech model and the input signal.

Preferably, the model groups are shared across speakers. Advantageously, by allowing the model groups to be shared across speakers, separate speaker dependent model sets for each individual speaker need not be stored thereby resulting in a reduction in memory storage requirements.

In accordance with another broad aspect, the invention provides a method and apparatus for generating a hybrid speech model associated to a given speech element. The hybrid speech model is suitable for use by a speech recognition device during speech recognition. The apparatus comprises an input for receiving an input signal derived from a spoken utterance that contains at least one speech element that potentially matches the given speech element. The apparatus further comprises a model group associated to the given speech element comprising a plurality of speech models. Each speech model in the plurality of speech models is a different representation of the given speech element. The apparatus further comprises a processing unit coupled to the input for processing the input signal and the model group to generate a hybrid speech model associated to the given speech element. The hybrid speech model is a combination of speech models of the plurality of speech models, the combination being effected on the basis of the input signal derived from the spoken utterance. The apparatus further comprises an output for releasing a signal conveying the hybrid speech model associated to the given speech element in a format suitable for use by a speech recognition device.

In a specific example of implementation, the hybrid speech model is derived by computing a linear combination of the speech models in the model group.

In accordance with another broad aspect, the invention provides a computer readable medium comprising a program element suitable for execution by a computing apparatus for implementing the above-described apparatus.

In accordance with another aspect, the invention provides an apparatus and method for generating a complex speech model associated to a given speech element suitable for use by a speech recognition device during speech recognition. The apparatus comprises an input for receiving an input signal derived from a spoken utterance that contains at least one speech element that potentially matches the given speech element. The apparatus further comprises a model group associated to the given speech element. The model group comprises a plurality of speech models, each speech model being a different representation of the given speech element. The model group comprises two sets of speech models namely a first set having speech models of a first type and a second set-having speech models of a second type. Each speech model of a first type in the first set is associated to a speech model of the second type in the second set. The apparatus further comprises a processing unit coupled to the input for processing the input signal and the model group to generate a hybrid speech model associated to the given speech element. The hybrid speech model is a combination of speech models of the first type of the plurality of speech models, the combination being effected on a basis of the input signal derived from the spoken utterance. The apparatus further comprises processing the hybrid speech model to generate a complex speech model associated to the given speech element, the complex speech model being a combination of speech models of the second type of the plurality of speech models. The apparatus further comprises an output for releasing a signal indicative of the complex speech model associated to the given speech element in a format suitable for use by a speech recognition device.

In a specific example of implementation, any speech model of a second type is indicative of a speech model having a higher complexity than a speech model of a first type to which it is associated.

Continuing with the specific example of implementation, the hybrid speech model is derived by computing a first linear combination of the speech models of the first type. The first linear combination is characterized by a first set of parameters indicative of weights associated to speech models of the first type. The complex speech model is derived by computing a second linear combination of the speech models of the second type. The second linear combination is characterized by a second set of parameters indicative of weights associated to speech models of the second type. The first set of parameters and the second set of parameters are indicative of substantially same weights.

In accordance with another broad aspect, the invention further provides a computer readable medium comprising a data structure for storing a plurality of model groups, each model group being associated to a respective speech element in a phonetic alphabet. Each model group comprises a plurality of speech models, each model group being suitable for use by a speech-processing device.

In a specific example of implementation, each model group comprises two sets of speech models namely a first set having a set of speech models of a first type and a second set having speech models of a second type. Each speech model of a first type in the first set is associated to a speech model of the second type in the second set. Each speech model of the second type is indicative of a speech model having a higher complexity than a speech model of the first type to which the speech model of the second type is associated.

For the purpose of this specification, the expression "speech element" is used to designate a basic speech recognition unit. In a specific example, a speech element is indicative of a data element selected from the set consisting of phones, diphones, syllables and words. It will be readily apparent to the person skilled in the art that representations of phones such as allophones and triphones may be used without detracting from the spirit of the invention.

For the purpose of this specification, the expressions "model" and "speech model" are used to designate a mathematical representation of the acoustic properties of a speech element. Modeling speech elements is well-known in the art to which this invention pertains. Commonly used models include Hidden Markov models (HMMs) where each speech element is represented by a sequence of states and transitions between the states. Speech models may have different levels of complexity depending on the number of transitions, states and parameters characterizing the states that are used to model the range of acoustic properties. The expressions "model" and "speech models" should be given a broad interpretation to include an electronic representation of the speech models themselves, a symbol being associated to a respective speech model, a pointer to a memory location allowing to extract a speech model or any other representation allowing a speech model to be extracted.

Other aspects and features of the present invention will become apparent to those ordinarily skilled in the art upon review of the following description of specific embodiments of the invention in conjunction with the accompanying figures.

DETAILED DESCRIPTION

Figure 1:
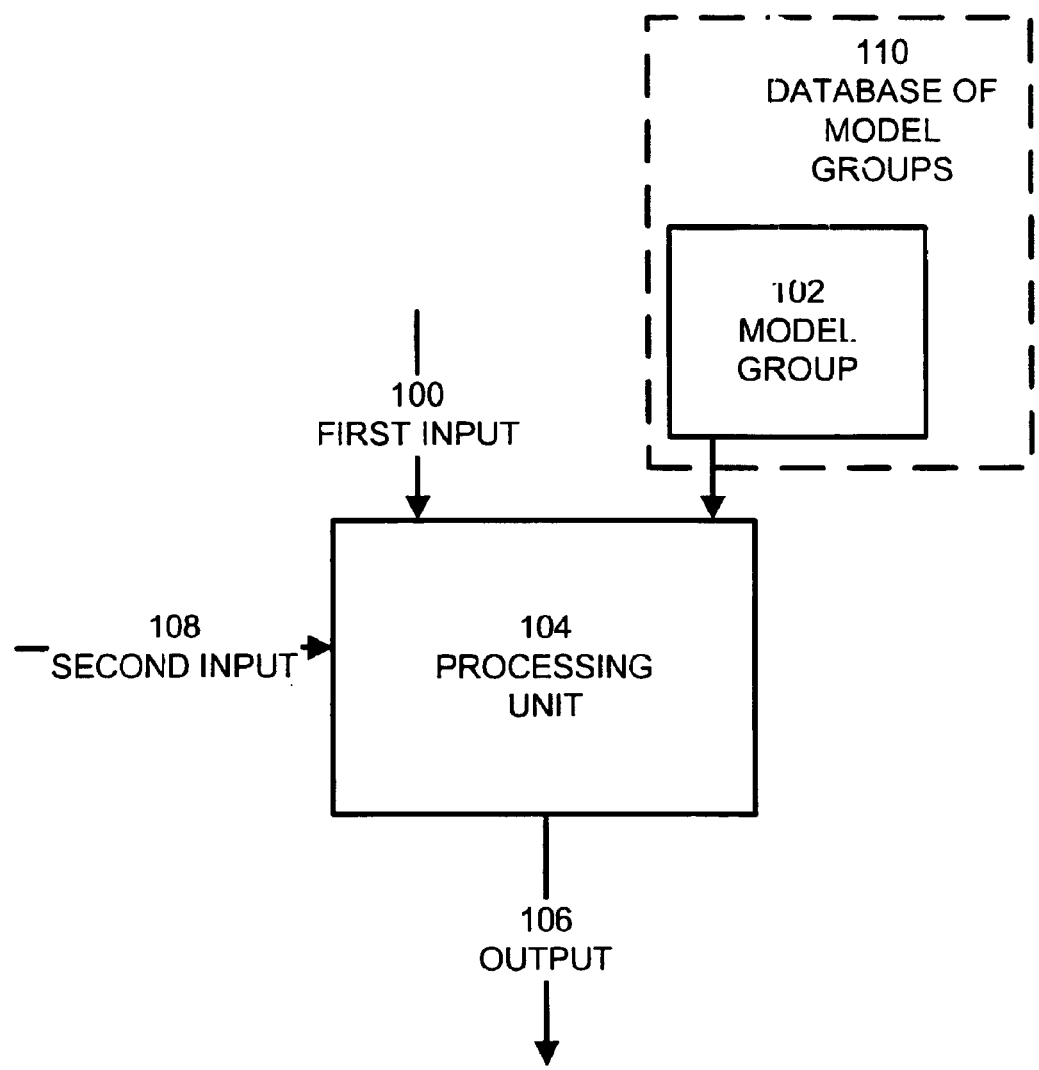
FIG. 1 shows a block diagram of an apparatus for generating a hybrid speech model in accordance with an embodiment of the invention.

In a first form of implementation, as shown in FIG. 1, the invention provides an apparatus for generating a hybrid speech model associated to a given speech element, the hybrid speech model being suitable for use by a speech recognition device during speech recognition. The apparatus comprises an input 100, a model group 102, a processing unit 104 and an output 106.

The input 100 is for receiving an input signal derived from a spoken utterance that contains at least one speech element that potentially matches the given speech element. In a specific example of implementation, the input signal derived from a spoken utterance is indicative of a speaker specific speech model associated to the at least one speech element. The hybrid speech model is derived based on the hypothesis that the input signal is a match to the given speech model.

The output 106 is for releasing a signal indicative of the hybrid speech model associated to the given speech element in a format suitable for use by a speech recognition device.

The model group 102 associated to the given speech element comprises a plurality of speech models, each speech model being a different representation of the given speech element. In a specific example of implementation, each speech models is indicative of allophonic models having three states, each state having an eight component mixture of Gaussians. Other formats of speech models may be used without detracting from the spirit of the invention and are well known in the art to which this invention pertains.

As a variant, the apparatus comprises a database of model groups 110 comprising a plurality of model groups. Each model group is associated to a respective speech element and comprises a set of speech models. In a specific example of implementation, the database of model groups is stored in a data structure, such as a table, and comprises a plurality of records, each record being associated to a given speech element and comprising a set of speech models. In a very specific example of implementation the speech element is an element of a phonetic alphabet. The table below shows a set of records of the speech elements /a/, /s/ and and /r/. The number of speech models in each model group may vary for each speech element without detracting from the spirit of the invention.

| Speech Element | Speech model #1 | Speech model #2 | Speech model #3 |
|---|---|---|---|
| /a/ | MODEL_A_/a/ | MODEL_B_/a/ | MODEL_C_/a/ |
| /s/ | MODEL_A_/s/ | | |
| /r/ | MODEL_A_/r/ | MODEL_B_/r/ | |

In a specific implementation of the same variant, the input 100 is a first input and the input signal received at the first input 100 is a first input signal. The apparatus further comprises a second input 108 for receiving a second input signal indicative of a data element identifying the given speech element. The processing unit 104 is operative to extract from the database of model groups 110 a certain model group associated to the data element received at the second input 108 identifying the given speech element.

The processing unit 104 is coupled to the input 100 for processing the input signal and the model group 102 to generate a hybrid speech model associated to the given speech element. The hybrid speech model is a combination of speech models of the model group 102 on the basis of the input signal derived from the spoken utterance received an the input 100. The speech models in the model group define a space indicative of the possible values that a hybrid speech model associated to a given speech element may take on. Preferably, the combination of speech models of the speech model group is such that the hybrid speech model is weighted toward the speaker specific speech model defined by the input signal received at the input 100.

In a specific example of implementation, the hybrid speech model is derived by computing a linear combination of the speech models in the model group 102. The linear combination is characterized by a set of parameters indicative of weights associated to speech models in the model group 102. The combination is effected by selecting a set of weights that minimizes the difference between the linear combination of speech models from the model group and the signal received at input 100 as well as constraining the hybrid model to lie within the space defined by the speech models in the model group. Preferably, the space defined by the speech models in the model group 102 is a convex space.

The set weights are the solution to a convex optimisation problem. Mathematically, the weights are computed by minimising the following quadratic function:

$$J([\text{weight vector}]^T) = \|[m_1 \ m_2 \ m_3 \ \ldots \ m_L][\text{weight vector}]^T - m\|^2 \quad \text{Equation 1}$$

where $m_1, m_2, \ldots m_L$ are speech models in the model group 102, m is a speaker specific speech model derived from the signal received at input 100 and [weight vector]$^T$ is a vector of L entries comprising of a set of weights, each weight in the set of weights being assigned to a respective speech model in the model group. Equation 1 is minimised under the convex-set constraints defined below:

a) SUM(weight$_l$; for l=1 to l=L)=1
b) weight$_l$>0 for $1 \leq l \leq L$

In this manner, the hybrid model defined by the combination:

$$\text{Hybrid model} = [m_1 \ m_2 \ m_3 \ \ldots \ m_L][\text{weight vector}]^T \quad \text{Equation 2}$$

will lie in the space defined by the speech models in the model group 102. Minimising a function of the type described in equation 1 under defined constraints is well known in the art of numerical analysis and will not be described further here.

Figure 2:
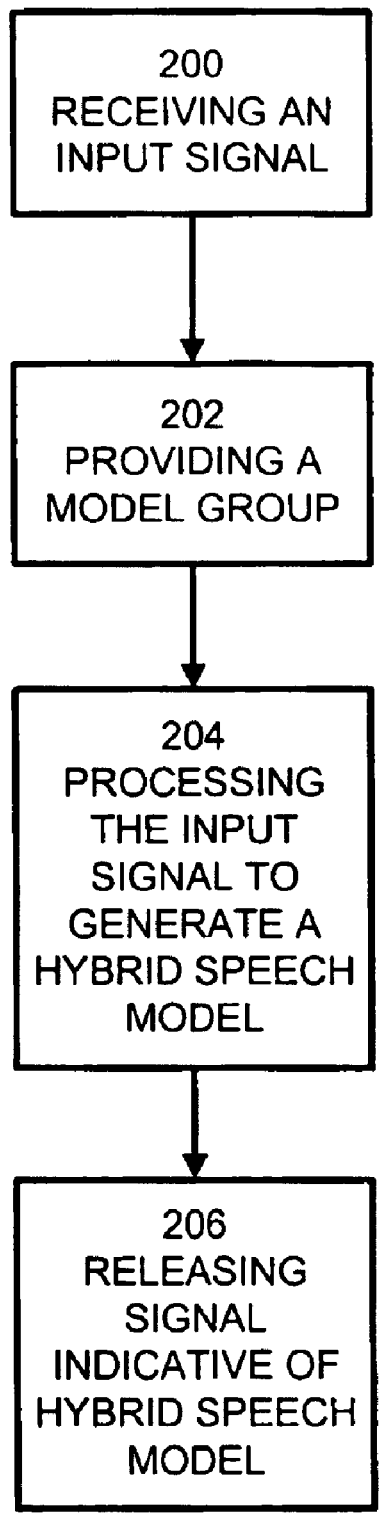
FIG. 2 shows a flow diagram of a method for generating a hybrid speech model in accordance with an embodiment of the invention.

As shown in FIG. 2, the invention provides a method for generating a hybrid speech model associated to a given speech element suitable for use by a speech recognition device during speech recognition. The method comprises receiving 200 an input signal derived from a spoken utterance that contains at least one speech element that potentially matches the given speech element. The method further comprises providing 202 a model group associated to the given speech element, said model group comprising a plurality of speech models. Each speech model in the plurality of speech models is a different representation of the given speech element. The method further comprises processing 204 the input signal received at step 200 and the model group to generate a hybrid speech model associated to the given speech element. The hybrid speech model is a combination of speech models in the plurality of speech models. The combination is effected on the basis of the input signal derived from the spoken utterance. The method further comprises releasing 206 a signal indicative of the hybrid speech model associated to the given speech element in a format suitable for use by a speech recognition device.

Figure 3:
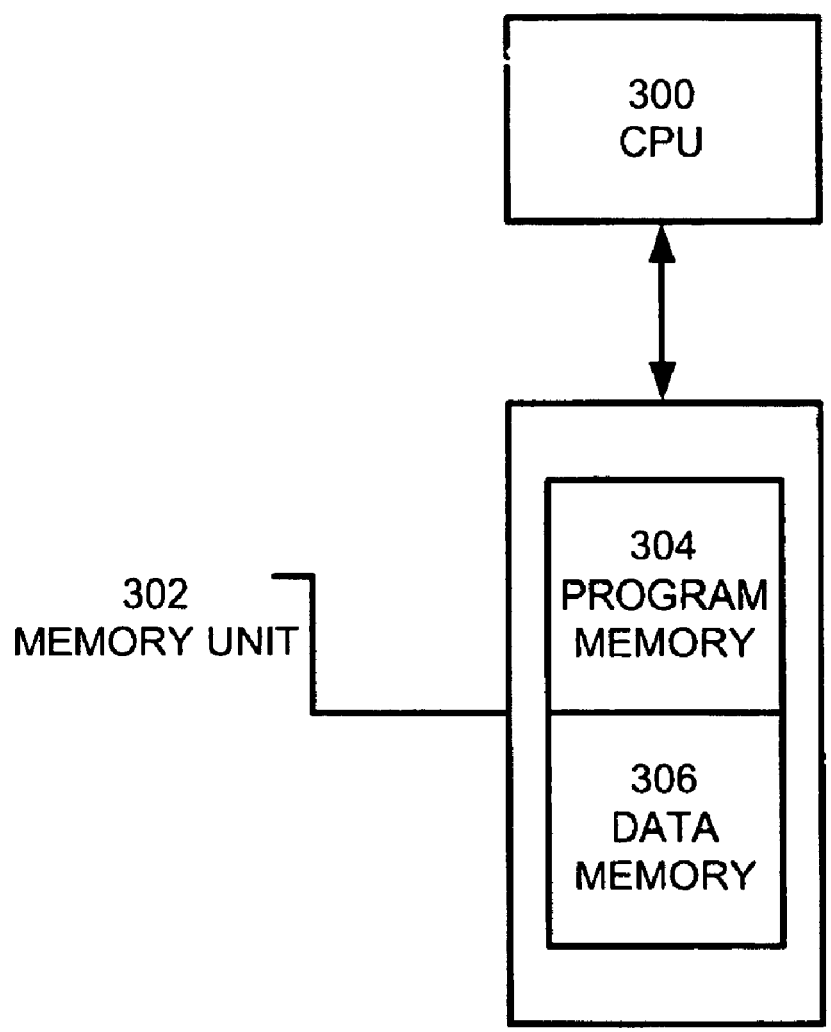
FIG. 3 shows a computing apparatus including a program element for generating a hybrid speech model in accordance with an embodiment of the invention.

In a specific example of implementation, the apparatus depicted in FIG. 1 is implemented on a digital computing apparatus of the type depicted in FIG. 3 of the drawings. Such a computing apparatus comprises a processor 300 coupled to a memory unit 302, the memory unit comprising a program memory 304 portion storing a program element for execution by the processor for implementing the processing unit 104. The memory unit 302 further comprises a data memory 306 portion for storing the model group described in connection with block 102 and optionally the database of model groups 110. As a variant, the processing unit 104 is a hardware device such as a ROM or other chip programmed on the basis of the above-described method.

Figure 4:
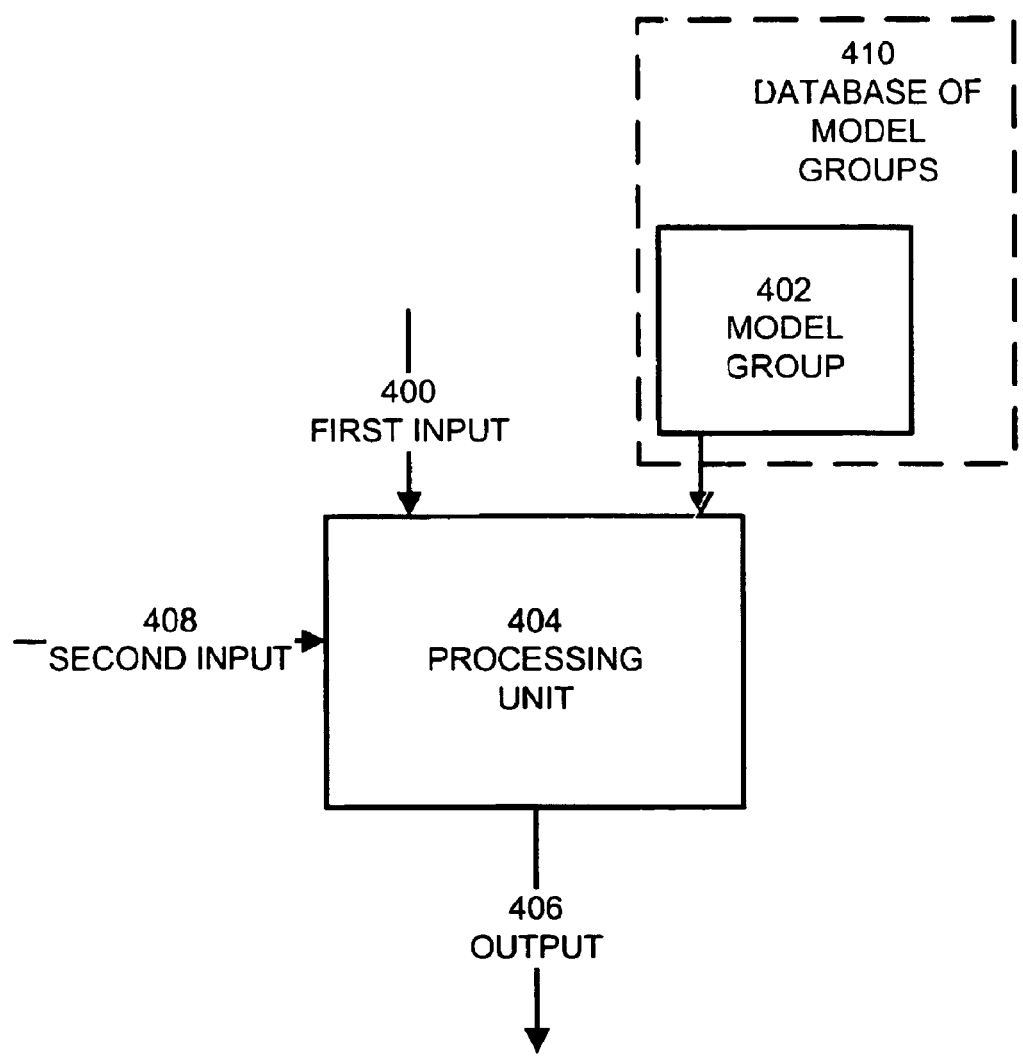
FIG. 4 shows an apparatus for generating a complex speech model in accordance with an embodiment of the invention.

In accordance with a second aspect, as shown in FIG. 4 of the drawings, the invention provides an apparatus for generating a complex speech model associated to a given speech element, the complex speech model being suitable for use by a speech recognition device during speech recognition. The apparatus comprises an input 400, a model group 402, a processing unit 404 and an output 406.

The input 400 is for receiving an input signal derived from a spoken utterance that contains at least one speech element that potentially matches the given speech element. In a specific example of implementation, the input signal derived from a spoken utterance is indicative of a speaker specific speech model associated to the at least one speech element.

The output 406 is for releasing a signal indicative of the complex speech model associated to the given speech element in a format suitable for use by a speech recognition device.

The model group 402 associated to the given speech element comprises a plurality of speech models, each speech model being a different representation of the given speech element. The model group comprises two sets of speech models namely a first set having speech models of a first type and a second set having speech models of a second type. Each speech model of a first type in the first set is associated to a speech model of the second type in the second set. In a specific example of implementation, any speech model of a second type is indicative of a speech model having a higher complexity than a speech model of a first type to which it is associated.

In a specific example of implementation, each speech model of a first type is indicative of a speech model having three states, each state having a single Gaussian as its model of observation density. Each speech model of a second type is indicative of a speech model having three states, each state having a eight component mixture of Gaussians. Other formats of speech models may be used without detracting from the spirit of the invention and are well known in the art to which this invention pertains.

As a variant, the apparatus comprises a database of model groups 410 comprising a plurality of model groups. Each model group is associated to a respective speech element and comprises a plurality of speech models, each model group being in format similar to that described in connection with block 402. In a specific example of implementation, the database of model groups 410 is stored on a computer readable medium in a data structure, such as a table, comprising a plurality of records. Each record is associated to a given speech element and comprises two sets of speech models namely a first set having speech models of a first type and a second set having speech models of a second type. Each speech model of a first type in the first set is associated to a speech model of the second type in the second set. In a very specific example of implementation the speech element is an element of a phonetic alphabet. The table below shows a set of records of the speech elements /a/, /s/ and /r/. The number of speech models in each model group may vary for each speech element without detracting from the spirit of the invention.

| Speech Element | Speech model #1 | Speech model #2 | Speech model #3 |
| --- | --- | --- | --- |
| /a/ | MODEL_A_/a/ COMPLEX_A_/a/ | MODEL_B_/a/ COMPLEX_B_/a/ | MODEL_C_/a/ COMPLEX_C_/a/ |
| /s/ | MODEL_A_/s/ COMPLEX_A_/s/ | | |
| /r/ | MODEL_A_/r/ COMPLEX_A_/r/ | MODEL_B_/r/ COMPLEX_B_/r/ | |

For example, in the above table the first set for speech element /a/ comprises {MODEL_A_/a/; MODEL_B_/a/; MODEL_C_/a/} and the second set for speech element /a/ comprises {COMPLEX_A_/a/; COMPLEX_B_/a/; COMPLEX_B_/a/}.

In a specific implementation of the same variant, the input 400 is a first input and the input signal received at the first input 400 is a first input signal. The apparatus further comprises a second input 408 for receiving a second input signal indicative of a data element identifying the given speech element. The processing unit 404 is operative to extract from the database of model groups 410 a certain model group associated to the data element received at the second input 408 identifying the given speech element.

The processing unit 404 is coupled to the input 400 for processing the input signal and the model group 402 to generate a hybrid speech model associated to the given speech element. The hybrid speech model is a combination of speech models of the first type of the model group 402 on the basis of the input signal derived from the spoken utterance received an the input 400. The hybrid speech model is generated, substantially in the same manner as described previously in connection with FIG. 1 of the drawings.

In a specific example of implementation, the hybrid speech model is derived by computing a linear combination of the speech models in the model group 402. The linear combination is characterized by a first set of parameters indicative of weights associated to speech models in the model group 402. As described previously, the hybrid model is expressed by as equation 2, reproduced below for the reader's convenience:

$$\text{Hybrid model} = \mu[m_1 \ m_2 \ m_3 \ \ldots \ m_L][\text{weight vector}]^T \quad \text{Equation 2}$$

where $m_1, M_2, \ldots ML$ are speech models in the model group 102, and $[\text{weight vector}]^T$ is a vector of L entries comprising of a set of weights, each weight in the set of weights being assigned to a respective speech model in the model group and where the $[\text{weight vector}]^T$ satisfies the following conditions:

a) $\text{SUM}(\text{weight}_l;$ for $l=1$ to $l=L)=1$ b) $\text{weight}_l > 0$ for $1 \leq l \leq L$ The processing unit 404 is further operative to process the hybrid speech model to generate a complex speech model associated to the given speech element. The complex speech model is a combination of speech models of the second type in the plurality of speech models.

In a specific example of implementation, the hybrid model is a first linear combination and is characterized by a first set of parameters indicative of weights associated to speech models of the first type. The complex speech model is derived by computing a second linear combination of the speech models of the second type, the second linear combination being characterized by a second set of parameters indicative of weights associated to speech models of the second type. The first set of parameters and the second set of parameters are indicative of substantially same weights.

Mathematically, the complex speech model can be expressed as follows:

$$\text{Complex model} = [b_1 \ b_2 \ b_3 \ \ldots \ b_L][\text{weight vector}]^T \quad \text{Equation 3}$$

where $b_1, b_2, \ldots b_L$ are speech models of the second type in the model group 402 and $[\text{weight vector}]^T$ is the vector of L entries comprising of a set of weights derived from the calculations of the hybrid model.

As a variant, the processing unit 404 is further operative to implement a fall-back unit for an input signal derived from a spoken utterance that cannot be represented accurately by the plurality of speech models in the model group 402.

In a specific example of implementation, the complex speech model depends on how close the hybrid model can be to the input signal received at input 400. Mathematically, this was expressed as the minimum value that $J([\text{weight vector}]^T)$ can take on in equation 1 reproduced below for the user's convenience.

$$J([\text{weight vector}]^T) = \|[m_1 \ m_2 \ m_3 \ \ldots \ m_L][\text{weight vector}]^T - m\|^2 \quad \text{Equation 1}$$

If $J([\text{weight vector}]^T)$ is very small, then the complex model is a good approximation of the input speech signal. If $J([\text{weight vector}]^T)$ is large then the approximation is does not provide a good approximation.

In a specific example, the fall-back unit is operative to condition the linear combination of the speech models of the second type on the basis of the how close the hybrid model can be to the input signal received at input 400. This is effected by providing an interpolation between a base complex speech models ($b_0$) and the linear combination of the speech models of the second type shown in equation 3. In this specific example, the base complex speech models ($b_0$) is a speaker independent speech model associated to the speech element. The base model $b_0$ may be stored in the model group 402 or may be received as a parameter by the apparatus depicted in FIG. 4 without detracting from the spirit of the invention.

A mathematical example will better illustrate this concept. The example below is shown for the purpose of example only and the person skilled in the art will readily find that variations are possible without detracting from the spirit of the invention. The computation of the complex model is modified to account for how well the hybrid model approximated the input signal. Equation 3 above is modified as follows:

$$\text{Complex model}=f*[b_1\ b_2\ b_3\ \ldots\ b_L][\text{weight vector}]^T+(1-f)b_0 \quad \text{Equation 3(modified)}$$

For the present example, the following relation is used:

$$f=1-\min[J([\text{weight vector}]^T)/\|m\|^2,\ 1]$$

When the hybrid model is a good approximation of the input signal, the $J([\text{weight vector}]^T)$ is small relative to the speaker specific model m and f will be close to unity. On the other hand, if the model group 402 cannot represent the given least one speech element, the $J([\text{weight vector}]^T)$ can be quite large, in which event the model adaptation falls back to the base model $b_0$.

Figure 5:
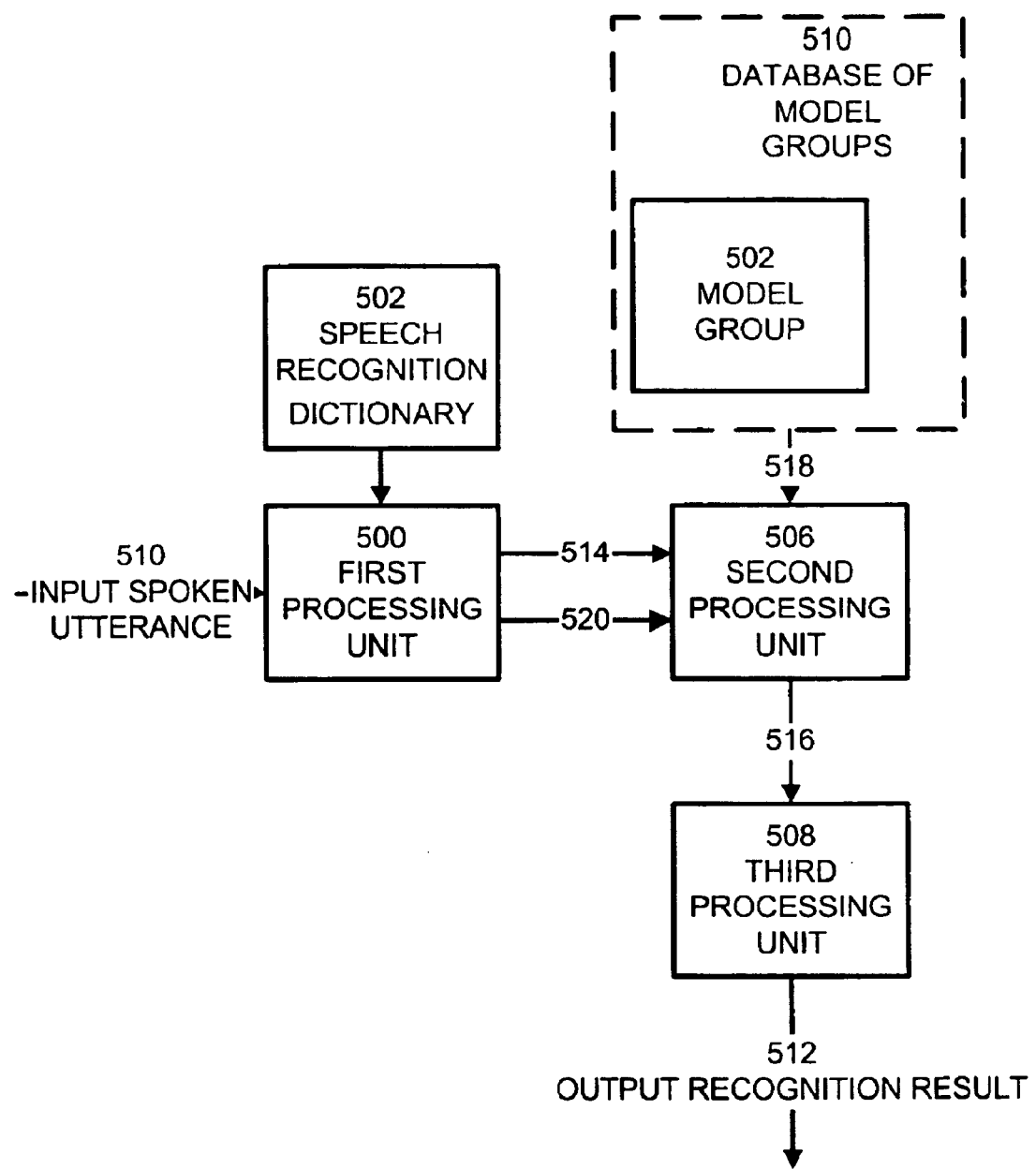
FIG. 5 shows a speech recognition system in accordance with an embodiment of the invention.

In accordance with another aspect, the invention provides a speech recognition system of the type depicted in FIG. 5 of the drawings. The speech recognition system comprises an input 510, a first processing unit 500, a second processing unit 506, a third processing unit 508 and an output 512.

The input 510 is for receiving an input signal derived from a spoken utterance that is indicative of at least one speech element.

The first processing unit 500 is coupled to the input 1510 and is operative for processing the input signal to derive from a speech recognition dictionary 502 a speech model associated to a given speech element that constitutes a potential match to the at least one speech element. In a specific example of implementation, the first processing unit 500 is operative to perform rough probabilistic calculations and to extract from the speech recognition dictionary 502 a list of possible candidate speech models for the spoken utterance received at the input 510. The first processing unit allows the system to eliminate the entries in the speech recognition dictionary 502 that are most unlikely to constitute a match to the spoken utterance. Typical algorithms that can be used at this stage include the fast score estimation and the graph search algorithms. As a reference, the reader is invited to consult Gupta V. N., Lennig M., Mermelstein P. "A fast search strategy in a large vocabulary word recogniser INRS-Telecommunications. J. Acoust. Soc. Am. 84 (6), December 1988, p.2007 and U.S. Pat. No. 5,515,475 by inventors Gupta V. N. & Lennig M. The content of these documents is incorporated herein by reference. Other algorithms may be used here without detracting from the spirit of the invention. In a specific example of implementation, the first processing unit 500 is operative for generating a speaker specific speech model derived on the basis of the input spoken utterance received at input 510, the speaker specific speech model being indicative of the acoustic characteristics of the least one speech element. Continuing with this specific example, the speaker specific speech model is derived by conditioning the at least one speech model using a maximum a posteriori adaptation method. For more information on using maximum a posteriori (MAP) adaptation, the reader is invited to consult Gauvain et al. (1994), "maximum a posteriori estimation for multivariate Gaussian mixture observations of Markov chains", IEEE Transaction Speech Audio Process. 2, pages 291 to 298.

The second processing unit 506 is coupled to the first processing unit 500. The second processing unit is operative to generate a modified version of the speech model derived from the dictionary by conditioning the latter on the basis of the input spoken utterance received at input 510. In other words, the modified version of the speech model derived from the dictionary is derived based on the hypothesis that the input spoken utterance is a match to the speech model derived from the dictionary. By allowing the speech model derived from the dictionary to be modified for each spoken attempt, adaptation of the recognition process is permitted from the first spoken utterance. In addition, separate speaker dependent model sets for each individual speaker need not be stored since model groups can be shared across speakers thereby resulting in a reduction in memory storage requirements. This is particularly useful for a speech recognition system operates in an environment with a large number of users. For example, this is particularly useful in the context of an automatic directory assistance system making use of the speech recognition system.

In a first form of implementation, the second processing unit 506 is implemented substantially as processing unit 104 described previously. The processing unit is operative to generate a hybrid speech model associated to the speech model derived from the dictionary on the basis of a signal derived from the input spoken utterance. The second processing unit 506 is coupled to the first processing unit 500 via a first coupling member 514 and a second coupling member 520. In this first form of implementation, the first coupling member corresponds to the first input 100 and is for receiving the speaker specific speech model generated by the first processing unit 500. The second coupling member 520 corresponds to the second input 108 and is for receiving the speech model derived by the first processing unit 500 from the speech recognition dictionary 502. The second processing unit 506 is further coupled to a database of model groups 510 via a third coupling link 518. The database of model groups 510 is implemented in a matter similar to that described in connection with block 110 in FIG. 1 and comprises a plurality of models groups 502 implementation in a matter similar to that described in connection with block 102. The second processing unit 506 releases a signal indicative of a hybrid speech model at an output coupling member 516 corresponding to output 106 in FIG. 1.

In a second form of implementation, the second processing unit 506 is implemented substantially as processing unit 404 described previously. The processing unit is operative to generate a complex speech model associated to the speech model derived from the dictionary on the basis of a signal derived from the input spoken utterance. The second processing unit 506 is coupled to the first processing unit 500 via a first coupling member 514 and a second coupling member 520. In this second form of implementation, the first coupling member corresponds to the first input 400 and is for receiving the speaker specific speech model generated by the first processing unit 500. The second coupling member 520 corresponds to the second input 408 and is for receiving the speech model derived by the first processing unit 500 from the speech recognition dictionary 502. The second processing unit 506 is further coupled to a database of model groups 510 via a third coupling link 518. The database of model groups 510 is implemented in a matter similar to that described in connection with block 410 in FIG. 4 and comprises a plurality of models groups 502 implementation in a matter similar to that described in connection with block 402. The second processing unit 506 releases a signal indicative of a complex speech model at an output coupling member 516 corresponding to output 406 in FIG. 4.

The third processing unit 508 is coupled to the second processing unit 506 via coupling link 516. The third processing unit is operative for processing the input spoken utterance received at input 510 on the basis of the modified version of the at least one speech model generated by the second processing unit 506. The third processing unit 508 generates a recognition result indicative of whether the modified version of the at least one speech model constitutes a match to the input signal. The output 512 is for releasing a signal indicative of the recognition result.

In a specific example of implementation, the third processing unit 516 is a re-scoring unit operative to perform more precise speech recognition calculations that the first processing unit 500. The speech recognition calculation are effected by performing comparisons between the acoustic characteristics of the input spoken utterance received at input 510 and the modified version of the speech model generated by the second processing unit 506. The third processing unit 508 may make use of techniques such as the Viterbi algorithm with complete allophone models and model distances. Although these require heavy complex computations, the number of candidates for which the computation must be performed has been greatly reduced. The top scoring recognition candidate is then released as the recognition result at output 512.

Figure 6:
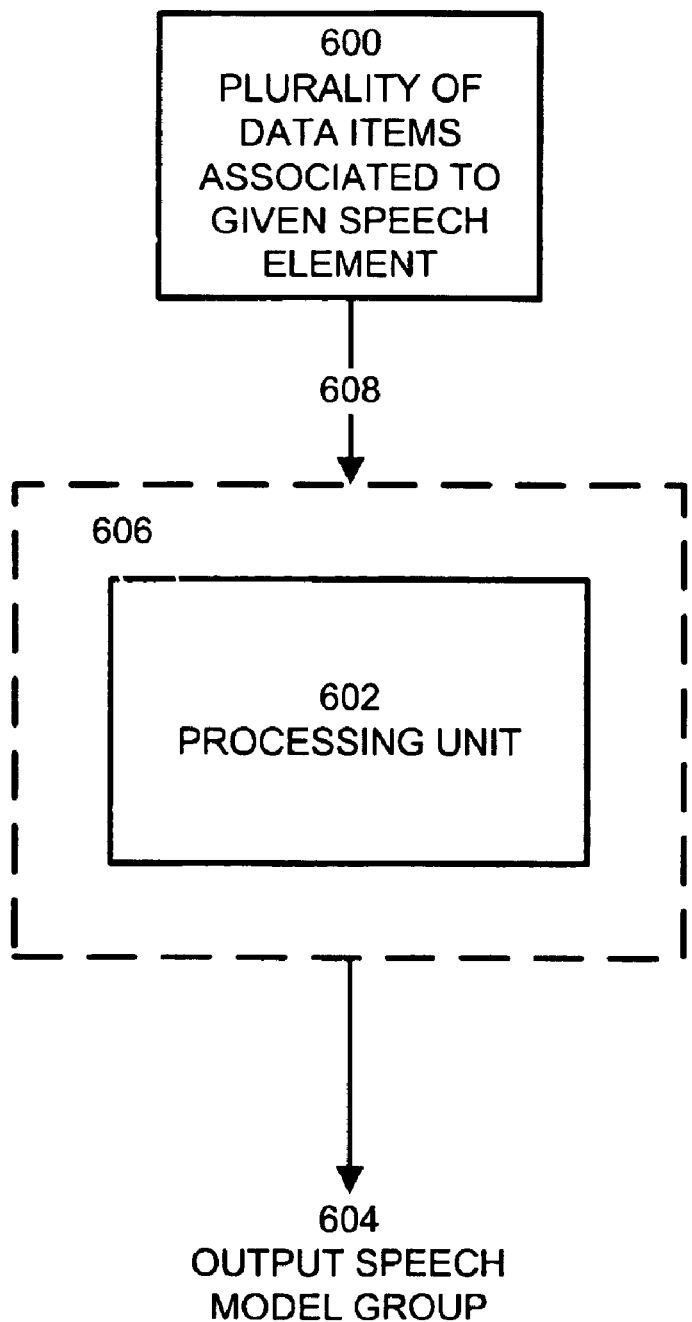
FIG. 6 shows a high-level block diagram of an apparatus for generating a speech model group in accordance with another aspect of the invention.

In accordance with another aspect, as shown in FIG. 6, the invention provides an apparatus 606 for generating a speech model, group associated to a given speech element, the speech model group containing a plurality of speech models. The apparatus 606 comprises an input 608, a processing unit 606 and an output 604.

The input 608 is for receiving a plurality of data items derived from a plurality of spoken utterances, each utterance in the plurality of spoken utterances being associated to the given speech element. In a specific example of implementation, this is effected by providing a computer readable storage medium coupled to the apparatus 606 via the input 608. The computer readable medium contains a plurality of data items associated to the given speech element. The data items may be in the form of speech tokens, in the form of feature vectors derived from speech tokens or in any other representation providing acoustical information on the speech tokens without detracting from the spirit of the invention.

Figure 7:
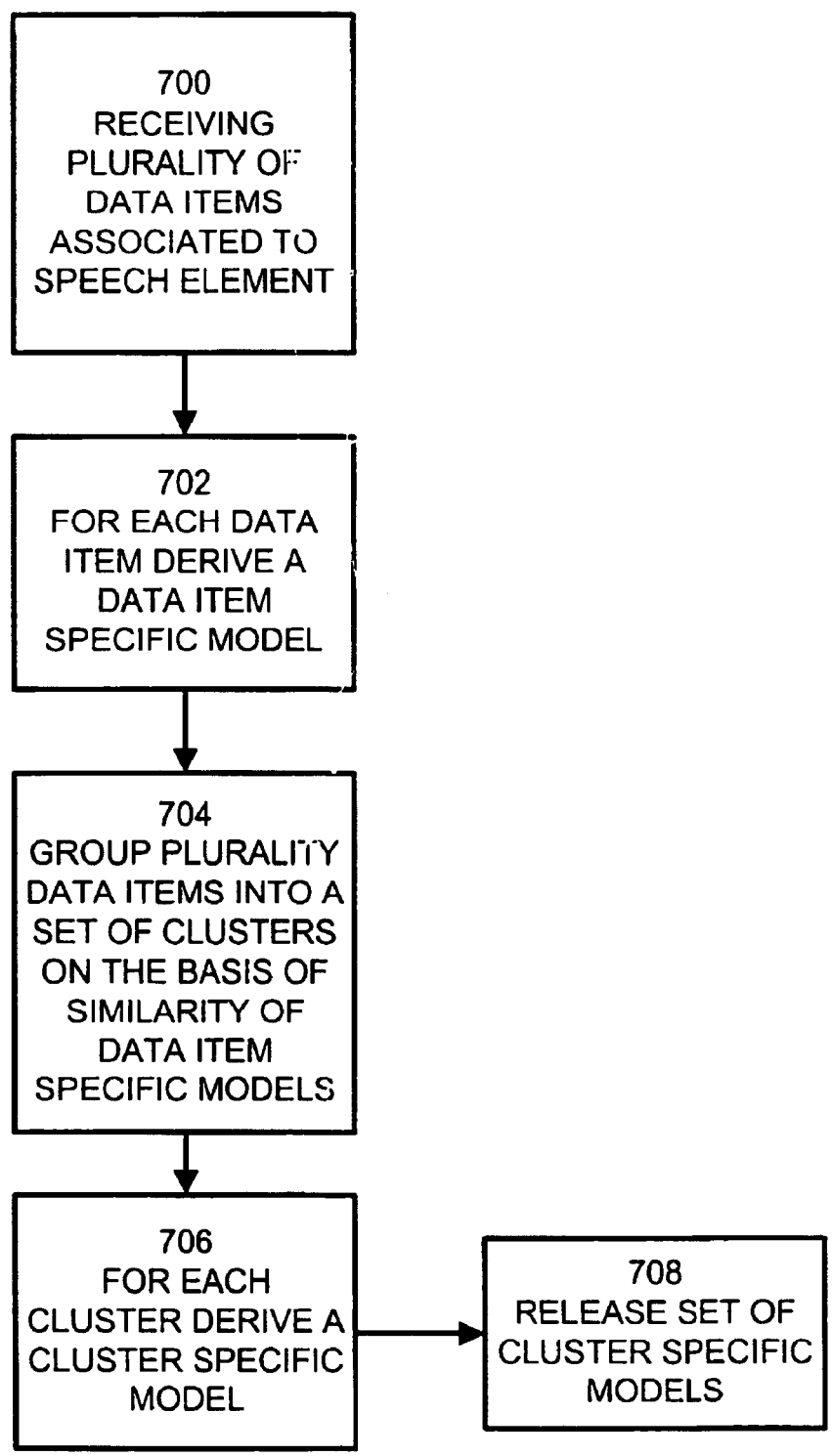
FIG. 7 shows a flow diagram of a method for generating a speech model group in accordance with the spirit of the invention.

The processing unit 602 is coupled to the input 602 and is operative for generating a speech model group associated to the given speech element comprising a plurality of speech models, each speech model being a different representation of the given speech element. In a specific example of implementation, the functionality of the processing unit 602 will be best understood in connection with the flow chart depicted in FIG. 7.

The processing unit 602 is operative for receiving 700 a plurality of data items associated to a given speech element. The processing unit 602 processes each data item to extract acoustic characteristics. This is effected by deriving 702 for each data item a data item specific speech model. In a specific example of implementation, the data item specific speech model is derived by applying a maximum a posteriori adaptation method on the basis of the speech token to a reference model associated to the given speech element. In this specific example the reference speech model in a speaker independent model associated to the given speech element. The data items are then grouped 704 into a set of data item clusters, each data item cluster having at least on data item, on a basis of the similarity between the acoustic characteristics of the data items. Clustering may be effected by any suitable clustering technique such as the K-means algorithm. A description of a K-means algorithm, also: known as the LBG algorithm, is given in Makhoul et al. "Vector quantization in speech coding," Proceedings of the IEEE, vol. 73, pp. 1551–1588, November 1985 whose content is hereby incorporated by reference. The reader in also invited to consult Rabiner et al. (1979) "Applications of clustering techniques to speaker-trained isolated word recognition," Bell System Technical Journal, vol. 58, pp.2217–2231 whose content is hereby incorporated by reference. Such clustering techniques are well known in the art to which this invention pertains and will not be further described here. Following this the processing unit 602 is further operative to process 706 each data item cluster to generate a cluster specific model. In a specific example of implementation, a given cluster specific speech model is derived by applying a maximum a posteriori adaptation method on the basis of the data items in the associated data item cluster to a reference model associated to the given speech element. The signal indicative of the set of cluster specific models is then released 708 at output 604. The set of cluster specific models forms a speech model group comprising a plurality of speech models, each speech model in the speech model group being associated to a respective data item cluster. Each speech model in the speech model group is an approximation of acoustic properties of data items in the respective data item cluster.

Figure 8:
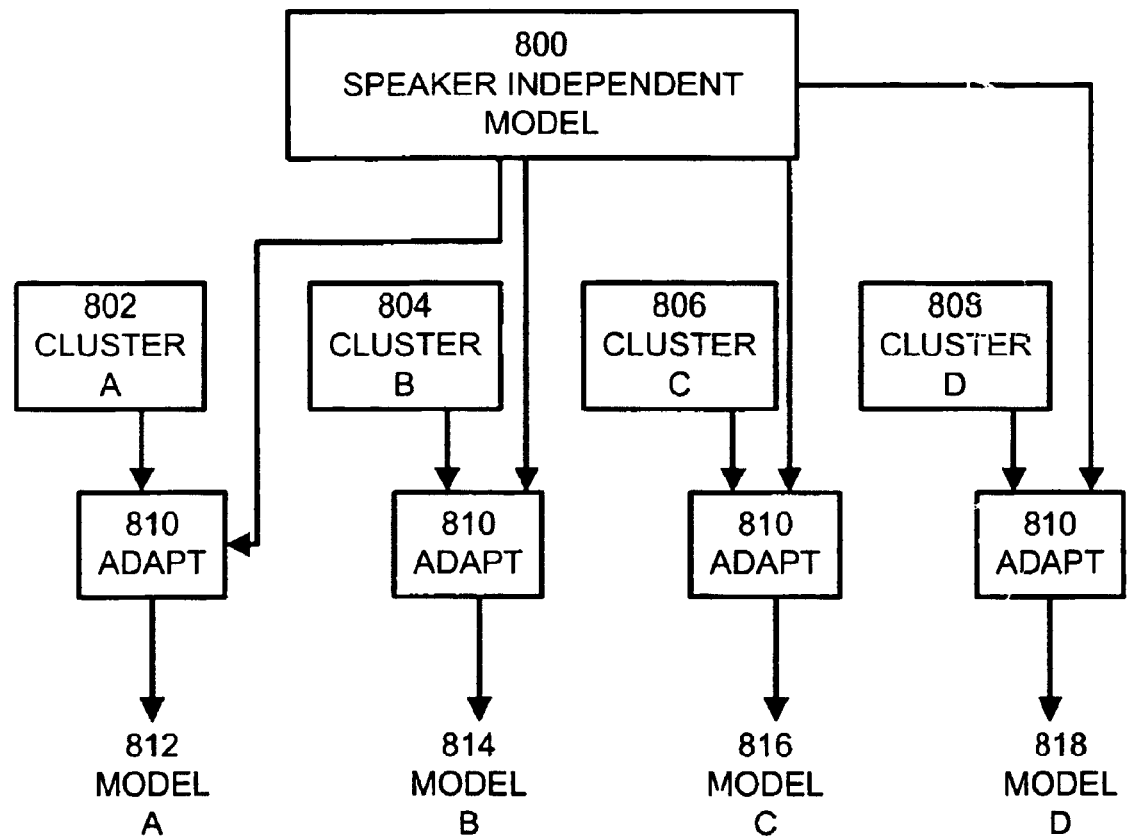
FIG. 8 shows an apparatus for generating a speech model group in accordance with the spirit of the invention.

FIG. 8 shows a block diagram of an apparatus for generating the speech model group associated to a given speech element in accordance with the spirit of the invention. The apparatus comprises a speaker independent model unit comprising a data element indicative of a speaker independent model associated to the given speech element. The apparatus further comprises a set of data item clusters 802 804 806

808, each data item cluster containing a plurality of data items. The apparatus further comprises at least one adaptation units 810 for processing the speaker independent speech model on the basis of a given data item cluster to derive a cluster specific model. The adaptation unit may be a single module operative to process each data item clusters 802 804 806 808 to derive the respective cluster specific models 812 814 816 818 or a set of adaptation units without detracting from the spirit of the invention. The adaptation unit 810 may make use of any suitable adaptation method such as maximum a posteriori (MAP) adaptation and Maximum Likelihood Linear Regression (MLLR).

The above-described apparatus for generating a speech model group described in the specification can also be implemented on any suitable computing platform. Such a computing platform typically includes a processor and a memory or computer readable medium connected to the processor by a data communication bus. The memory stores the data and the instructions of the program element implementing the functional blocks depicted in the drawings and described in the specification. In a specific example, the program element implements the processing unit 602. In another specific example, the program element is operative for implementing the adaptation unit 810. In a specific example, the plurality of data items associated to a given speech element is stored in the data portion of the memory. The program element operates on the data 904 in accordance with the algorithms described above to generate a speech model group using the techniques described in this specification.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. An apparatus for generating a complex speech model associated to a given speech element, said complex speech model being suitable for use by a speech recognition device during speech recognition, said apparatus comprising:
   an input for receiving an input signal derived from a spoken utterance that contains at least one speech element that potentially matches the given speech element;
   a model group associated to the given speech element, said model group comprising a plurality of speech models, each speech model of said plurality of speech models being a different representation of the given speech element, said model group comprising two sets of speech models namely a first set having speech models of a first type and a second set having speech models of a second type, each speech model of a first type in said first set being associated to a speech model of the second type in the second set;
   a processing unit coupled to the input for;
   a) processing the input signal and the model group to generate a hybrid speech model associated to the given speech element said hybrid speech model being a weighted combination of speech models of the first type in said plurality of speech models effected on the basis of the input signal derived from the spoken utterance;
   b) processing the hybrid speech model to generate the complex speech model associated to the given speech element, said complex speech model being a weighted combination of speech models of the second type in said plurality of speech models;
   an output for releasing signal indicative of said complex speech model associated to the given speech element in a format suitable for use by a speech recognition device.

2. An apparatus as defined in claim 1, wherein any speech model of a second type is indicative of a speech model having a higher complexity than a speech model of a first type to which the respective speech model of a second type is associated.

3. An apparatus as defined in claim 2, wherein tee given speech element is indicative of a data element selected from the set consisting of phones, diphones, syllables and words.

4. An apparatus as defined in claim 3, wherein said input signal derived from a spoken utterance is indicative of a speaker specific speech model associated to the least one speech element.

5. An apparatus as defined in claim 4, wherein said hybrid speech model is weighted toward the speaker specific speech model.

6. An apparatus as defined in claim 5, wherein said hybrid speech model is derived by computing a linear combination of the speech models of the first type.

7. An apparatus as defined in claim 6, wherein said linear combination is a first linear combination and is characterized by a first set of parameters indicative of weights associated to speech models of the first type, said complex speech model being derived by computing a second linear combination of the speech models of the second type, said second linear combination being characterized by a second set of parameters indicative of weights associated to speech models of the second type.

8. An apparatus as defined in claim 7, wherein said first set of parameters and said second set of parameters are indicative of substantially same weights.

9. An apparatus as defined in claim 7, wherein a relationship between said first set of parameters and said second set of parameters is dependent on a distance between the hybrid model and the input signal.

10. An apparatus as defined in claim 9, wherein the processing unit further comprises:
    a fall-back unit conditioning the weighted combination of speech models of the second type by interpolation to a degree based upon a distance between the hybrid model and the input signal.

11. An apparatus as defined in claim 2, wherein said input is a first input and wherein said input signal is a first input signal, said apparatus further comprising:
    a) a second input for receiving a second input signal indicative of a data element identifying the given speech element;
    b) a database of model groups comprising a plurality of model groups, each model group being associated to a respective speech element, each model group comprising two sets of speech models namely a first set having speech models of a first type and a second set having speech models of a second type, each speech model of a first type in said first set being associated to a speech model of the second type in the second set;

said processing unit being further operative for extracting from said database of model groups a certain model group associated to the data element received at said second input identifying the given speech element.

12. A speech recognition system comprising:

an input for receiving an input signal indicative of a spoken utterance that is indicative of at least one speech element;

a first processing unit coupled to said input operative for processing the input signal to derive from a speech recognition dictionary at least one speech model associated to a given speech element that constitutes a potential match to the al least one speech element, and wherein said first processing unit is operative for generating a speaker specific speech model derived on the basis of the input signal, the speaker specific speech model being indicative of the acoustic characteristics of the at least one speech element;

second processing unit coupled to said first processing unit for generating, using a predefined weighting constraint, a modified version of the at least one speech model on the basis of the input signal;

a third processing unit coupled to said second processing unit for processing the input signal on the basis of the modified version of the at least one speech model to generate a recognition result indicative of whether the modified version of the at least one speech model constitutes a match to the input signal;

an output for releasing signal indicative of the recognition result; and wherein said modified version of the at least one speech model is indicative of a complex speech model associated to the given speech element, and wherein said second processing unit comprises:

coupling member for allowing data exchange between the first processing unit and the second processing unit, said coupling member being suitable for receiving the speaker specific speech model derived from the input signal;

a model group associated to the given speech element, said model group comprising a plurality of speech models, each speech model of said plurality of speech models being a different representation of the given speech element, said model group comprising two sets of speech models namely a first set having speech models of a first type and a second set having speech models of a second type, each speech model of a first type in said first set being associated to a speech model of the second type in the second set;

a functional unit coupled to the coupling member for:
  a) processing the speaker specific speech model and the model group to generate a hybrid speech model associated to the given speech element, said hybrid speech model being a weighted combination of speech models of the first type in said plurality of speech models effected on the basis of the speaker specific speech model;
  b) processing the hybrid speech model to generate the complex speech model associated to the given speech element, said complex speech model being a combination of speech models of the second type in said plurality of speech models;

an output coupling member for allowing data exchange between the second processing unit and the third processing unit, said coupling member being suitable for releasing a signal indicative of the complex speech model associated to the given speech element.

13. A speech recognition system as defined in claim 12, wherein any speech model of the second type is indicative of a speech model having a higher complexity than a speech model of the type to which the speech model of the second type is associated.

14. A speech recognition system as defined in claim 13, wherein said hybrid speech model is weighted toward the speaker specific speech model.

15. A speech recognition system as defined in claim 14, wherein said hybrid speech model is derived by computing a linear combination of the speech models of the first type.

16. A speech recognition system as defined in claim 15, wherein said linear combination is a first linear combination and is characterized by a first set of parameters indicative of weights associated to speech models of the first type, said complex speech model being derived by computing a second linear combination of the speech models of the second type, said second linear combination being characterized by a second set of parameters indicative of weights associated to speech models of the second type.

17. A speech recognition system as defined in claim 16, wherein said first set of parameters and said second set of parameters is indicative of substantially the same weights.

* * * * *

UNITED STATES PATENT AND TRADEMARK OFFICE
CERTIFICATE OF CORRECTION

PATENT NO. : 6,868,381 B1
DATED : March 15, 2005
INVENTOR(S) : Stephen Douglas Peters, Daniel Boies and Benoit Dumoulin It is certified that error appears in the above-identified patent and that said Letters Patent is hereby corrected as shown below:

Column 10,
Line 10, Equation 2, after "hybrid model=", delete "$\mu$".
Line 12, delete "$M_2,....M_L$" and insert -- $m_2,....m_L$ --.

Column 11,
Line 44, delete "1510" and insert -- 510 --.

Column 15,
Line 63, after "element" insert -- , --.

Column 16,
Line 6, after "releasing" insert -- a --.
Line 15, delete "tee" and insert -- the --.
Line 21, after "the" insert -- at --.

Column 17,
Line 13, delete "a1" and insert -- at --.
Line 20, prior to "second" insert -- a --.
Line 30, after "releasing" insert -- a --.

Column 18,
Line 25, after "model of the", first occurrence, insert -- first --

Signed and Sealed this

Fifth Day of July, 2005

JON W. DUDAS
*Director of the United States Patent and Trademark Office*